Sept. 30, 1952  J. U. LEHN  2,611,991
ANIMAL TRAP
Filed July 3, 1951  2 SHEETS—SHEET 1
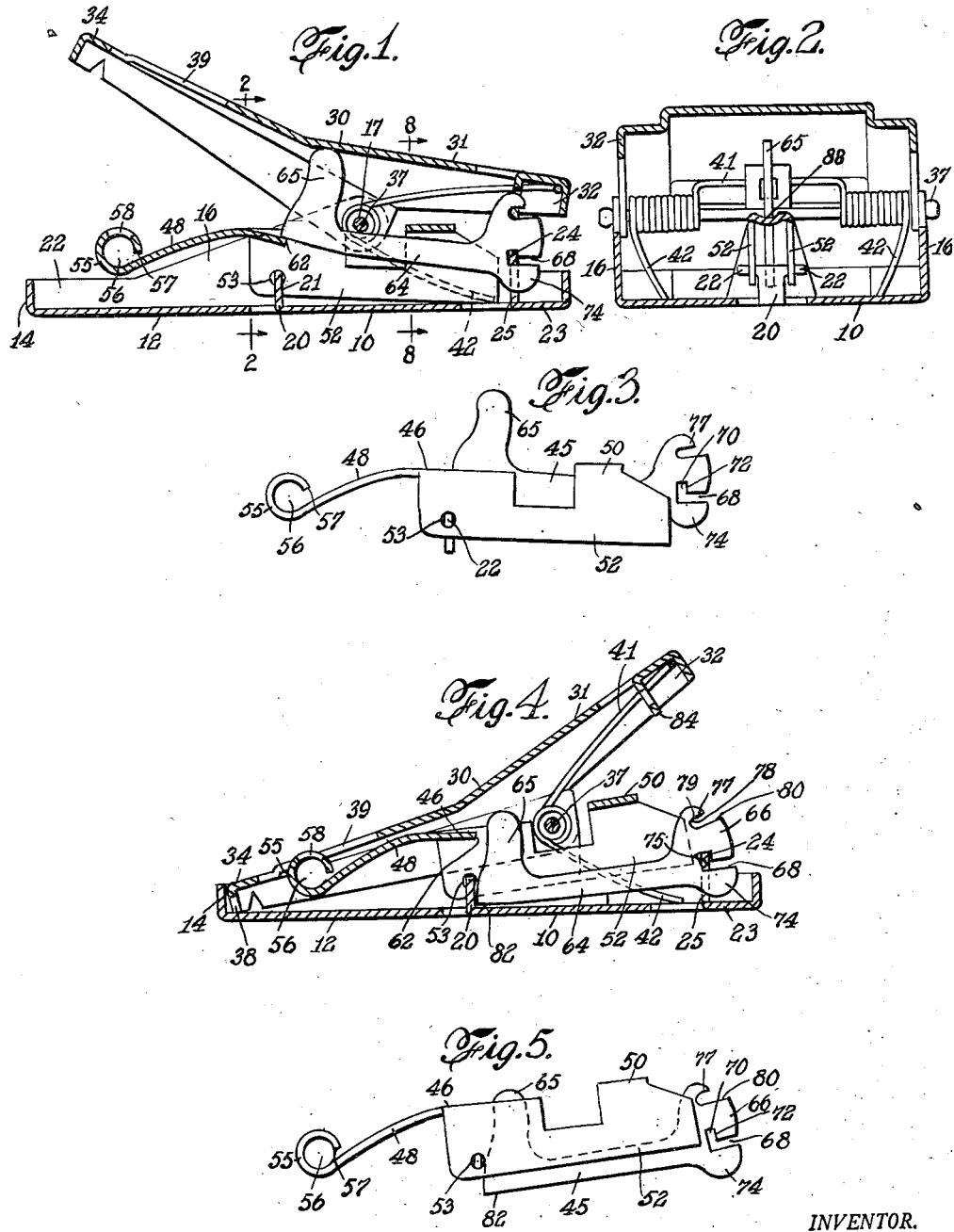
INVENTOR.
JOHN U. LEHN
BY Robert E. Burns
ATTORNEY.

Sept. 30, 1952 J. U. LEHN 2,611,991
ANIMAL TRAP
Filed July 3, 1951 2 SHEETS—SHEET 2

INVENTOR.
JOHN U. LEHN
BY Robert A. Burns
ATTORNEY

Patented Sept. 30, 1952

2,611,991

UNITED STATES PATENT OFFICE 2,611,991

ANIMAL TRAP

John U. Lehn, Lititz, Pa., assignor to Animal Trap Company of America, Lititz, Pa., a corporation of Pennsylvania Application July 3, 1951, Serial No. 235,036

3 Claims. (Cl. 43—83.5)

This invention relates to animal traps and is more particularly concerned with an animal trap having a spring actuated jaw or striker.

A type of animal trap commonly used for catching mice, rats and like small animals in the home and in industrial establishments involves a spring-urged jaw pivotally mounted upon a suitable base. When the trap is set, the jaw is held back against the tension of the spring and when sprung by the animal forcefully pivots toward the base to catch the animal between the jaw and the base. In such traps, and especially in the case of larger traps adapted for catching rats, the spring, when placed under tension in the setting of the trap, exerts a relatively strong force upon the jaw and when released moves the jaw rapidly and forcefully from the set position to the sprung position against the base. If, in setting the trap, the jaw should be accidentally released, serious injury to the hands of the person setting the trap might result. Various proposals have been heretofore made for providing an automatic setting means for traps of this type wherein it is not necessary for the person setting the trap to bring his hands in a vulnerable position.

However, in this type of trap it is necessary that the bait holding portion of the trap be readily accessible for baiting when the trap is sprung since the baiting of a set trap is obviously a dangerous procedure and if the trap is at all sensitive, injury will inevitably occur unless special means are taken to prevent it. Furthermore, in the manufacture of traps for mice and rats, it is not only important that they be effective for their intended use but it is also essential that the construction be as free as possible from complicated and intricate elements and that the traps be adapted to be manufactured inexpensively, since this type of trap must be sold at retail at a relatively low price. Complicated structures, therefore, regardless of their effectiveness are generally not economical for traps of this type since they unduly increase the cost of manufacture. Prior attempts to manufacture automatically settable traps of the jaw type have resulted either in a structure too complicated for economical large scale production or have resulted in structures which are difficult to bait because of the inaccessibility of the bait holding member. Furthermore, in an effort to reduce the cost of the traps, it has been proposed to form the traps wholly of metal. The prior proposals, however, have not taken full advantage of the use of the metal and have not fully realized their intended advantages.

It is the principal object of the present invention to provide an improved automatically settable trap of the spring actuated jaw type.

It is another object of the invention to provide a trap of the character indicated which is positive and sensitive in action and is easily baited and set without danger.

It is a further object of the invention to provide an improved automatically settable trap formed wholly from metal.

In accordance with the invention there is provided a trap suitable for catching mice, rats and like small animals comprising a base, a spring actuated jaw pivotally mounted thereon, a locking bar engageable with the jaw, and a bait holding member having a detent portion engageable with the locking bar to hold the locking bar against movement when the trap is set. The construction of the trap is such that positive automatic setting takes place by cam action of the jaw against the locking bar, and the bait holding member is readily accessible for baiting when the trap is in the sprung position. Furthermore, means are provided to prevent accidental displacement of the cooperating parts of the trap when the trap is in sprung position.

Other objects and features of the invention will be readily apparent from the following detailed description thereof and from the drawings wherein, Fig. 1 is a longitudinal sectional view of a trap embodying features of the present invention showing the relationship of parts when the trap is in set position;

Fig. 2 is a transverse sectional view approximately along the line 2—2 of Fig. 1;

Fig. 3 is an elevational view of the bait holding and latching portions of the trap showing them in their relative positions when the trap is set;

Fig. 4 is a longitudinal sectional view showing the relationship of parts when the trap is in sprung position;

Fig. 5 is an elevational view of the bait holding and latching members of the trap showing their relative relationship in sprung position;

Figure 6:
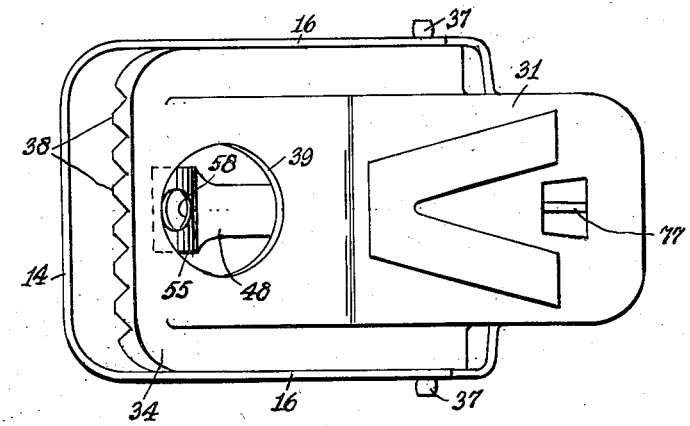
Fig. 6 is a plan view of the trap shown in Fig. 1.

Referring to the drawings, and particularly to

Figs. 1 to 3, the numeral 10 designates generally the base of the trap. The base 10 is stamped from a sheet of metal to provide a bottom 12 and a peripheral flange 14 extending around the bottom. Centrally of the base 10 the flange 14 rises on each side to define projecting portions 16 which are provided at their apices with apertures 17. Centrally of the bottom 12 there is provided an integral vertical T-shaped support bar 20 having a body 21 and outwardly extending arm portions 22, the support bar 20 being cut from the bottom 12 and bent upwardly at right angles. Similarly, the rear portion 23 of the base 10, which is advantageously of reduced width relative to the remainder of the base, is formed with an upstanding integral mount 24 which has a vertical slot 25 extending therein upwardly from the bottom 12.

Pivotally connected to the base 10 is the jaw 30. Jaw 30 has a rear portion 31 with a depending flange 32 along its sides, and an upwardly-directed front portion 34. The flange 32 is provided with apertures 35 which coincide with the apertures 17 in the base flange projecting portions 16 when the parts are assembled to permit the passage of a pin 37 which pivotally connects the jaw 30 the base 10. The dimensions of the jaw 30 are such that the rear portion 31 and the flange 32 are received inwardly of the flange 14 of the base, the two flanges thus telescoping at their forward ends when the trap is in sprung position, as shown in Fig. 4. As shown in Fig. 6, the forward portion of the flange 32 may be serrated to define teeth 38. The teeth 38 serve to increase the holding action of the jaw upon the animal, and they are thus advantageous but not essential. The forward portion of the flange 14 of the base 10 may similarly be serrated, if desired. The forward portion 34 of the jaw 30 is formed with a large aperture 39.

The jaw 30 is normally urged into sprung position by a spring 40 which is advantageously formed from a single length of wire which is coiled in two places about the pin 37, as shown in Figs. 2 and 3, and has a connecting bail-shaped portion 41 which bears against the underside of the rear portion 31 of jaw 30 and leg portions 42 which bear against the bottom 12 of the base 10. The spring 40 thus continually urges the trap into sprung position, i. e. it exerts a force upon the jaw 30 which causes it to pivot forwardly, that is to say, in a counter-clockwise direction as viewed in Fig. 1. The force with which the jaw moves toward the base depends, therefore, upon the power imparted by the spring 40.

The automatic setting of the trap results from the coaction of a locking bar 45 and a pivotally mounted bait holding treadle member 46. Referring particularly to Figs. 2 and 3, the treadle member 46 comprises a forward bait holding portion 48 and a rearward weighted portion 50. The weighted portion 50 has depending side flanges 52 having apertures 53 at their forward end for reception of the arms 22 of the T-shaped support bar 20 for pivotally mounting the treadle on the base. As may be seen in Fig. 1, the treadle is so mounted that the weighted portion 50 normally over balances the bait holding portion 48 and holds the bait holding portion 48 in an elevated position (Fig. 2).

In the embodiments illustrated, the bait holding portion 48 has a forwardly projecting arm which terminates in a recurvate end portion 55 defining an approximately cylindrical chamber 56 and having a serrated edge 57 approaching but providing a small clearance of the order of $\frac{1}{32}$ inch to $\frac{1}{8}$ inch with respect to the arm portion of the member 48. Chamber 56 is provided with an aperture 58 and has open ends. This bait holding structure is described and claimed in my copending application, Serial No. 204,197 filed January 3, 1951. The bait holder of the present invention, however, is not limited to this specific bait holding arrangement and any other convenient form may be employed.

The weighted portion 50 of the treadle 46 is slotted as indicated at 60 for a purpose which will be explained hereafter. Thus, the top of the weighted portion 50 is provided with the longitudinal slot 60 which is substantially T-shaped in outline and has portions extending downwardly into the flanges 52. The slot 60 extends forwardly toward the bait holding portion of the treadle and ends in a detent edge 62. The treadle 46 is formed from a strip of metal which has been suitably cut and stamped to provide the above described structure.

Cooperating with the treadle 46 is the previously mentioned locking bar 45. The locking bar 45, like the treadle 46, is formed from a strip of metal which has been cut and stamped to define a relatively narrow main portion 64, an upwardly extending forward projection 65 and an enlarged rear portion 66. The rear portion 66 is formed with an inwardly extending longitudinal slot 68 having an upwardly extending forward extension 70 providing an abutment surface 72 along its rearward edge. The longitudinal slot 68 defines a tongue 74 at the bottom of the rear portion and, as will be seen by reference to Figs. 1 and 4, the locking bar 45 is pivotally mounted to the base 10 by reason of the passage of the tongue 74 through the slot 25 in the mount 24 which, as previously described, is formed integrally with the base 10 by suitably cutting the base and bending the mount upwardly at right angles. The cross bar 75 of the mount 24 extends through the slot extension 70 and thus provides a fulcrum for limited pivotal movement of the locking bar.

As shown in Fig. 5, the treadle 46 is positioned over the locking bar 45, the projection 65 extending upwardly through the slot 60 above the level of the top surface of the treadle. The upper part of the rear portion of the locking bar 45 has a rearwardly extending projection 77 at the lower end of which is a forwardly-extending locking recess 78. The upper wall 79 of the locking recess 78 is inclined upwardly to a slight degree depending upon the sensitivity desired in the trap. The lower wall of the locking recess 78 is formed with a downwardly and forwardly extending cam surface 80, the cam surface 80 extending rearwardly somewhat beyond the end of the projection 77, as may be clearly seen in Fig. 4, to insure engagement with the jaw when the trap is set, as will be described below.

When the forward end of the locking bar 45 is pivoted upwardly about mount 24, the lower edge of the locking bar is raised to the level of the top of the detent edge 62 on the treadle 46 and forward movement of the locking bar will cause its forward end to slide over the top of the detent edge. To facilitate this action, the lower forward portion of the locking bar is pointed and formed with a bearing surface 82. Engagement of the rear portion of the locking bar to cause the above described pivotal movement is effected by a downwardly projecting tongue 84 formed integrally with the rear portion 31 of the jaw 30 and having an aperture 85 defining a cam bar 86.

In setting the trap it is placed in a horizontal position with the base 10 downward. The jaw is pivoted by moving the rear portion 31 downwardly toward the base, e. g. by holding the rear portions of the jaw and the base between the thumb and the forefinger. As the rear portion of the jaw moves downwardly, the cam bar 86 engages the cam surface 80 and further pressure causes the locking bar 45 to pivot, the cam bar 86 sliding forwardly on the cam surface 80 until it is beneath the top wall 79 of the locking recess 78. As the locking bar pivots, the forward pointed lower end of the locking bar passes the detent edge 62 so that the bearing surface 82 lies above the adjacent surface of the treadle. Release of the jaw permits the tongue 84 to move upwardly and the cam bar 86 engages the top wall 79 of the locking recess 78, causing the locking bar to slide forwardly to move the bearing surface 82 into engagement with the top surface of the treadle at the forward end of the slot 60. There is enough play in the pivotal mounting of the locking bar to permit such movement. Advantageously, this portion of the surface of the treadle is formed with a slight depression 88 to facilitate reception of the bearing surface 82. Continued forward movement of the locking bar by reason of the action of the cam bar 86 against the surface 79 is prevented by engagement of the cross bar 75 with the abutment surface 72 of the slot extension 70. This engagement also prevents further movement of the cam bar 86 and thus locks the jaw in set position.

The trap is tripped or sprung by the downward or forward movement of the bait holding portion 48 of the treadle 46 as a result of pressure exerted upon it by the animal attempting to take the bait. Downward movement of the bait holding portion causes the treadle to pivot about the arms 22 and to free the bearing surface 82 of the locking bar of engagement with the surface adjacent detent edge 62. The locking bar then pivots forwardly under the combined influence of gravity and the force exerted upon the surface 79 by the cam bar 86. Forward pivoting of the locking bar thus releases the cam bar 86 from the locking recess 78 and the jaw pivots forwardly under the force exerted by the spring 40, the forward jaw portion 34 moving rapidly toward the base 10 thereby catching the animal, the teeth 38 on the forward portion of the flange 32 serving to hold the animal more securely. Similarly, forward movement of the bait holding portion 48 frees the bearing surface 82 of the locking bar of engagement with the surface adjacent detent edge 62 and sets the above-mentioned sequence of steps in operation.

It will be observed that when the trap is in sprung position as shown in Fig. 4, the recurvate end 55 of the bait holding portion 48 extends upwardly through the aperture 39 in the forward portion 34 of the jaw by reason of the rearward pivotal movement of the treadle under the influence of the weighted portion 50. The trap is therefore very easily baited, the selected bait, e. g. cheese, bacon or the like being stuffed into the cylindrical chamber 56, which is readily accessible. It will also be noted that the projection 65 at the forward end of the locking bar 45 at all times extends through the aperture 60 and keeps the locking bar in alignment with respect to the treadle no matter in what position the trap is held. Displacement of the locking bar with respect to the treadle is thereby prevented and proper positioning of the parts for automatic setting of the trap is always insured.

Figure 7:
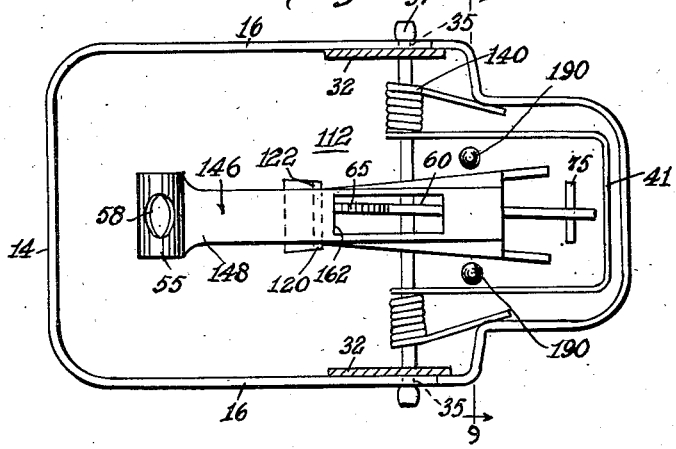
Fig. 7 is a horizontal sectional view of a trap embodying features of the invention and similar to the trap of Figs. 1 through 6 but showing a modified form of base which permits release of the jaw upon lateral movement of the bait pedal.
Figure 8:
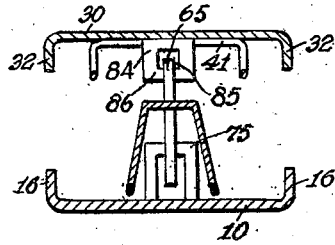
Fig. 8 is a sectional view taken approximately along the line 8—8 of Fig. 1.
Figure 9:
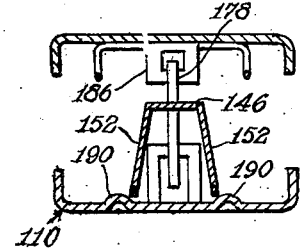
Fig. 9 is a sectional view taken approximately along the line 9—9 of Fig. 7.

As above described, in the trap shown in Figs. 1 through 6 the release of the jaw takes place upon downward or forward movement of the bait holding portion 48 of the treadle 46 as a result of pressure exerted upon it by the animal attempting to take the bait. In accordance with a preferred feature of the invention, however, I provide means for effecting the release of the treadle also upon lateral movement of the bait holding portion 48, thus increasing the likelihood of timely release of the jaw. In some cases the animal taking the bait may move the bait holding portion laterally without exerting any downward or forward pressure upon it. It is advantageous, therefore, to insure that the jaw will be released under such conditions. An embodiment of the invention having lateral jaw release means is shown in Figs. 7 and 9, wherein corresponding parts are designated by the same reference numerals used in Figs. 1 through 6 with the addition of 100. As seen in Figs. 7 and 9, the bottom 112 of the base 110 is formed with two integral upwardly-extending substantially semi-spherical projections or bosses 190 disposed on each side of the flanges 152 of the treadle 146. The bosses 190 are positioned near the rear edge of the flanges 152 and are disposed in such manner that any appreciable lateral movement of the treadle 146 will cause the lower edge of one of the flanges to ride up on the surface of the adjacent boss 190, thus causing the treadle to pivot forwardly about arms 122 of T-shaped support bar 120 upon which the treadle is pivotally mounted. Thus, when the forward bait holding portion 148 of the treadle is moved laterally by the animal, the rear portion of the treadle will be simultaneously moved laterally in the opposite direction, causing one of the flanges 152 to ride up upon the adjacent boss 190. This will force the treadle to pivot forwardly and as a result the forward bait holding portion will move downwardly. As will be clear from the description of the embodiment shown in Figs. 1 through 6, downward movement of the bait holding portion 148 trips or springs the trap by freeing the locking bar from engagement with the surface adjacent detent edge 162. The locking bar then pivots forwardly and releases the cam bar 186 from the locking recess 178 and the jaw pivots forwardly under the force exerted by the spring 140. Springing of the trap is thus insured in the embodiment of Figs. 7 and 9 upon downward or forward movement of the bait holding portion 148 or upon lateral movement of this member in either direction.

As previously mentioned, ease of manufacture and assembly is a very important consideration from a practical standpoint in the construction of a mouse and rat trap which is adapted for use in the home and which must be economical to manufacture. All of the parts of the above described traps, with the exception of the spring 40 and the pin 37, are formed from integral strips of sheet metal which are cut and stamped to the desired form, and the treadle and the locking bar are pivotally mounted on integral portions of the base 10 without the need for supplementary mounting means. Thus, to assemble the trap, the tongue 74 is first inserted through the slot 25 in the mount 24 by passing the slot 68 vertically along the cross bar 75 and then pivoting the locking bar forwardly to cause the cross bar 75 to pass to the slot extension 70. The treadle is then placed over the locking bar and the flanges 52 pressed inwardly to engage the arms 22 of the T-shaped support bar 20. The jaw 30 and the spring 40 are then placed in position over the base 10 and the pin 37 pass through the aligned apertures 17 and 35 and the coils of the spring 40. The trap is then ready for use. It will be apparent that the manufacture and assembly of the trap is a relatively simple operation and yet a trap is provided which is effective in operation and fool-proof in action.

While I have thus disclosed my invention with particular reference to illustrative embodiments thereof, it will be apparent that various changes and modifications may be made in the embodiments shown and described without departing from the invention as defined in the appended claims, and it is intended, therefore, that all matter contained in the foregoing description and in the drawings shall be interpreted as illustrative and not in a limiting sense.

What I claim and desire to secure by Letters Patent is:

1. In a trap of the character described, a base, a spring actuated jaw pivotally mounted on said base, a treadle pivotally mounted on said base on a pivot member integral with said base, said treadle having a forward bait holding portion and a rearward weighted portion normally holding the bait holding portion in an elevated position, said rearward weighted portion having downwardly extending side flanges engageable with the base, said base having upwardly extending bosses adjacent said flanges for engagement with said flanges upon lateral movement of said treadle, a locking bar engageable with the jaw and the treadle to hold the trap in set position, and means integral with said jaw for engagement with the locking bar.

2. In a trap of the character described, a base, a spring actuated jaw pivotally mounted on said base, a treadle pivotally mounted on said base on a pivot member integral with said base, said treadle having a forward bait holding portion and a rearward weighted portion normally holding the bait holding portion in an elevated position, said rearward weighted portion having downwardly extending side flanges engageable with the base, said base having upwardly extending bosses adjacent said flanges for engagement with said flanges upon lateral movement of said treadle, a locking bar engageable with the jaw and the treadle to hold the trap in set position, and means integral with said jaw for engagement with the locking bar, said locking bar having an upwardly extending projection at its forward end passing through a slot in said treadle and serving to maintain the relative positions of the treadle and the locking bar.

3. In a trap of the character described, a metal base, a spring actuated metal jaw pivotally mounted on said base, said jaw being formed from a sheet of metal and having an aperture at its forward end, a metal treadle pivotally mounted on said base, said treadle being U-shaped in cross-section at its pivot point and being pivoted on a T-shaped member integral with said base, said treadle having a forward bait holding portion and a rearward weighted portion normally holding the bait holding portion in an elevated position and extending through said aperture, said rearward weighted portion having downwardly extending side flanges engageable with the base, said base having upwardly extending bosses adjacent said flanges for engagement with said flanges upon lateral movement of said treadle, a metal locking bar engageable with the jaw and the treadle to hold the trap in set position, and means integral with said jaw for engagement with the locking bar, said locking bar having an upwardly-extending projection at its forward end passing through a slot in said treadle and serving to maintain the relative positions of the treadle and the locking bar.

JOHN U. LEHN.

REFERENCES CITED

The following references are of record in the file of this patent:

UNITED STATES PATENTS

| Number | Name | Date |
| --- | --- | --- |
| 2,247,660 | Lehn | July 1, 1941 |
| 2,428,721 | Peterson | Oct. 7, 1947 |